(12) United States Patent
DeCristofaro et al.

(10) Patent No.: US 6,960,860 B1
(45) Date of Patent: Nov. 1, 2005

(54) AMORPHOUS METAL STATOR FOR A RADIAL-FLUX ELECTRIC MOTOR

(75) Inventors: Nicholas J. DeCristofaro, Chatham, NJ (US); Dung A. Ngo, Morris Plains, NJ (US); Richard L. Bye, Jr., Morristown, NJ (US); Peter J. Stamatis, Morristown, NJ (US); Gordon E. Fish, Upper Montclair, NJ (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 09/506,533

(22) Filed: Feb. 17, 2000

Related U.S. Application Data

(63) Continuation-in-part of application No. 09/099,786, filed on Jun. 18, 1998.

(51) Int. Cl.⁷ .............................................. H02K 1/12
(52) U.S. Cl. ....................................... 310/216; 310/218
(58) Field of Search .............................. 310/217, 218, 310/216, 254, 261; 148/300, 302, 304, 306

(56) References Cited

U.S. PATENT DOCUMENTS

| | | | |
|---|---|---|---|
| 2,255,684 A | | 9/1941 | Smith .......................... 128/40 |
| 2,556,013 A | * | 6/1951 | Thomas ....................... 310/254 |
| 3,591,819 A | * | 7/1971 | Laing .......................... 310/217 |
| 4,197,146 A | | 4/1980 | Frischmann |
| 4,201,837 A | | 5/1980 | Lupinski ..................... 428/457 |
| 4,255,684 A | | 3/1981 | Mischler et al. ............. 310/216 |
| 4,392,072 A | | 7/1983 | Rosenberry ................. 310/216 |
| 4,409,041 A | * | 10/1983 | Datta et al. .............. 148/31.55 |
| 4,763,030 A | * | 8/1988 | Clark et al. ................... 310/26 |
| 4,881,989 A | * | 11/1989 | Yoshizawa et al. ......... 148/302 |
| 5,439,534 A | * | 8/1995 | Takeuchi et al. ............ 148/105 |
| 5,671,524 A | | 9/1997 | Damsky et al. ............... 29/596 |
| 5,731,649 A | | 3/1998 | Caamano ..................... 310/216 |
| 5,922,143 A | * | 7/1999 | Verin et al. ................. 148/108 |
| 6,462,456 B1 | * | 10/2002 | DeCristofaro et al. ...... 310/216 |

FOREIGN PATENT DOCUMENTS

| | | |
|---|---|---|
| DE | 28 05 435 | 8/1979 |
| DE | 28 05 438 | 8/1979 |
| FR | 2 538 970 | 7/1984 |
| JP | 61 012004 | 1/1986 |
| WO | WO 99/66624 | 12/1999 |
| WO | WO 00/28640 | 5/2000 |

OTHER PUBLICATIONS

Abstract for DE 28 05 435.
Abstract for DE 28 05 438.

* cited by examiner

Primary Examiner—Karl Tamai

(57) ABSTRACT

An amorphous metal stator for a high efficiency radial-flux electric motor has a plurality of segments, each of which includes a plurality of layers of amorphous metal strips. The plural segments are arranged to form a generally cylindrical stator having a plurality of teeth sections or poles protruding radially inward from the inner surface of the stator. In a first embodiment, the stator back-iron and teeth are constructed such that radial flux passing through the stator crosses just one air gap when traversing each segment of the stator. In a second embodiment, the stator back-iron and teeth are constructed such that radial flux passing through the stator traverses each segment without crossing an air gap.

36 Claims, 9 Drawing Sheets

AMORPHOUS METAL STATOR FOR A RADIAL-FLUX ELECTRIC MOTOR

CROSS-REFERENCE TO RELATED APPLICATION

This application is a Continuation-in-Part of application Ser. No. 09/099,786, filed Jun. 18, 1998, entitled "Amorphous Metal Stator For A Radial-Flux Electric Motor."

BACKGROUND OF THE INVENTION

1. Field of the Invention

This invention relates to a stator for an electric motor; and more particularly, to an amorphous metal stator for a high efficiency radial-flux electric motor.

2. Description of the Prior Art

A radial-flux design electric motor typically contains a generally cylindrical stator made from a plurality of stacked laminations of non-oriented, electrical steel. Each lamination has the shape of a circular washer having "teeth" that form the poles of the stator. The teeth protrude from the inner diameter of the stacked laminations and point toward the center of the cylindrical stator. Each lamination is typically formed by stamping, punching or cutting the mechanically soft, non-oriented electrical steel into the desired shape. The formed laminations are then stacked and bound to form a stator.

Although amorphous metals offer superior magnetic performance when compared to non-oriented electrical steels, they have long been considered unsuitable for use in electric motors due to certain physical properties and the corresponding fabricating limitations. For example, amorphous metals are thinner and harder than their non-oriented steel counterparts and consequently cause fabrication tools and dies to wear more rapidly. The resulting increase in the tooling and manufacturing costs makes fabricating amorphous metal stators using such techniques commercially impractical. The thinness of amorphous metals also translates into an increased number of laminations in the assembled stator, further increasing the total cost of an amorphous metal stator.

Amorphous metal is typically supplied in a thin continuous ribbon having a uniform ribbon width. However, amorphous metal is a very hard material making it very difficult to cut or form easily, and once annealed to achieve peak magnetic properties, becomes very brittle. This makes it difficult and expensive to use conventional approaches to construct an amorphous metal magnetic stator. The brittleness of amorphous metal also causes concern for the durability of a motor or generator which utilizes amorphous metal magnetic stators. Magnetic stators are subject to extremely high magnetic forces which change at every high frequencies. These magnetic forces are capable of placing considerable stresses on the stator material which may damage an amorphous metal magnetic stator.

Another problem with amorphous metal magnetic stators is that the magnetic permeability of amorphous metal material is reduced when it is subjected to physical stresses. This reduced permeability may be considerable depending upon the intensity of the stresses on the amorphous metal material. As an amorphous metal magnetic stator is subjected to stresses, the efficiency at which the core directs or focuses magnetic flux is reduced resulting in higher magnetic losses, reduced efficiency, increased heat production, and reduced power. This phenomenon is referred to as magnetostriction and may be caused by stresses resulting from magnetic forces during the operation of the motor or generator, mechanical stresses resulting from mechanical clamping or otherwise fixing the magnetic stator in place, or internal stresses caused by the thermal expansion and/or expansion due to magnetic saturation of the amorphous metal material.

Non-conventional approaches to amorphous metal stator designs have been proposed. In one approach, a "toothless" stator, consisting simply of a tape-wound amorphous metal toroid, has been suggested. While this approach produces an efficient motor, the large air gap between the stator and rotor limits the performance and control of the motor. A second approach attempts to replicate the conventional stator shape by combining a tape-wound amorphous metal toroid with stacks of cut amorphous metal. The wound amorphous metal toroid forms the back-iron of the stator and the cut amorphous metal stacks are mounted on the inner diameter of the toroid to form the teeth or poles. While this approach reduces the air gap between the stator and rotor, the magnetic flux must cross the many layers of tape wound back-iron as the flux passes from the tooth to the back-iron. This greatly increases the reluctance of the magnetic circuit and the electric current required to operate the motor.

A third approach, disclosed by U.S. Pat. No. 4,197,146 to Frischmann, fabricates the stator from molded and compacted amorphous metal flake. Although this method permits fabrication of complex stator shapes, the structure contains numerous air gaps between the discreet flake particles of amorphous metal. This will greatly increase the reluctance of the magnetic circuit and the electric current required to operate the motor.

A fourth approach, taught by German Patents DE 28 05 435 and DE 28 05 438, divides the stator into wound pieces and pole pieces. A non-magnetic material is inserted into the joints between the wound pieces and pole pieces, increasing the gap, and thus the reluctance of the magnetic circuit and the electric current required to operate the motor. The layers of material that comprise the pole pieces are oriented with their planes perpendicular to the planes of the layers in the wound hack iron pieces. This configuration further increases the reluctance of the stator, because contiguous layers of the wound pieces and of the pole pieces meet only at points, not along full line segments, at the joints between their respective faces. In addition, this approach teaches that the laminations in the wound pieces are attached to one another by welding. The use of heat intensive processes, such as welding, to attach amorphous metal laminations will recrystallize the amorphous metal at and around the joint. Even small sections of recrystallized amorphous metal will increase the magnetic losses in the stator.

A fifth approach, disclosed by U.S. Pat. No. 2,255,684 to Mischler, involves fabricating the stator from either laminated strips of amorphous metal or from moldable composites of amorphous metal flake. Stator fabrication using laminated strips involves bending the strips to the desired stator shape. The mechanical stresses imparted on the laminated strips during the shaping operation will increase the core loss of the finished stator. This approach does not envision annealing of the stator to relieve the mechanical stresses. Stators fabricated from moldable composites of amorphous metal flake will contain numerous air gaps between the discreet flake particles. This will greatly increase the reluctance of the magnetic circuit and the electric current required to operate the motor.

SUMMARY OF THE INVENTION

The present invention provides an amorphous metal stator for a high efficiency radial-flux electric motor. Generally stated, the stator comprises a plurality of segments, each of which comprises a plurality of layers of amorphous metal strips. The plural segments are configured to form a generally cylindrical stator having a plurality of teeth sections or poles protruding radially inward from the inner surface of the stator. In a first embodiment, the stator back-iron and teeth are constructed such that radial flux passing through the stator crosses just one air gap when traversing each segment of the stator. In a second embodiment, the stator back-iron and teeth are constructed such that radial flux passing through the stator traverses each segment without crossing an air gap.

The present invention further provides a brushless radial-flux DC motor having an amorphous metal stator generally comprising a plurality of segments, each of which comprises a plurality of layers of amorphous metal strips. The plural segments are configured to form a generally cylindrical stator having a plurality of teeth sections protruding radially inward. In a first embodiment, the stator back-iron and teeth are constructed such that radial flux passing through the stator crosses just one air gap when traversing each segment of the stator. In a second embodiment, the stator back-iron and teeth are constructed such that radial flux passing through the stator traverses each segment without crossing an air gap. The DC motor of the present invention further comprises a rotor rotatingly disposed within the stator and means for supporting the stator and rotor in predetermined positions with respect to each other.

The present invention further provides a method of constructing an amorphous metal stator for a radial flux electric motor comprising the steps of (i) forming a plurality of segments, each segment comprising a plurality of layers of amorphous metal strips; and (ii) assembling the segments together to form a stator. The segments formed in accordance with the present invention are arranged such that magnetic flux traversing each segment crosses a maximum of one air gap.

The stator of the invention has a core loss less than "L" when operated at an excitation frequency "f" to a peak induction level $B_{max}$ wherein L is given by the formula $L = 0.0074 \ f \ (B_{max})^{1.3} + 0.000282 \ f^{1.5} \ (B_{max})$ said core loss, said excitation frequency and said peak induction level being measured in watts per kilogram, hertz, and teslas, respectively. The low core loss evidenced by the stator of this invention improves the efficiency of the motor, reducing power consumption and heat production therein.

BRIEF DESCRIPTION OF THE DRAWINGS

The invention will be more fully understood and further advantages will become apparent when reference is had to the following detailed description of the preferred embodiments of the invention and the accompanying drawings, wherein like reference numerals denote similar elements throughout the several views and in which.

DETAILED DESCRIPTION OF THE PREFERRED EMBODIMENTS

The present invention provides an amorphous metal stator for a high efficiency radial-flux electric motor. The stator of the present invention generally comprises a plurality of segments, each of which comprises a plurality of layers of amorphous metal strips. The plural segments are configured to form a generally cylindrical stator having a plurality of teeth sections or poles protruding radially inward. In a first embodiment, the stator back-iron and teeth are constructed such that radial flux passing through the stator crosses just one air gap when traversing each stator segment. In a second embodiment, the stator back-iron and teeth are constructed such that radial flux passing through the stator traverses each segment without crossing an air gap.

The stator of the invention is appointed for use in a radial flux motor having a rotor. It is comprised of elongated amorphous metal strips, i.e. strips having a length and width substantially greater than the thickness thereof. The length and width directions define top and bottom surfaces of the strip. The amorphous metal strips are formed into the stator in an orientation such that a line normal to either the top or bottom surface of each strip at substantially any point thereon is substantially perpendicular to the axis of rotation of the rotor.

Figure 1:
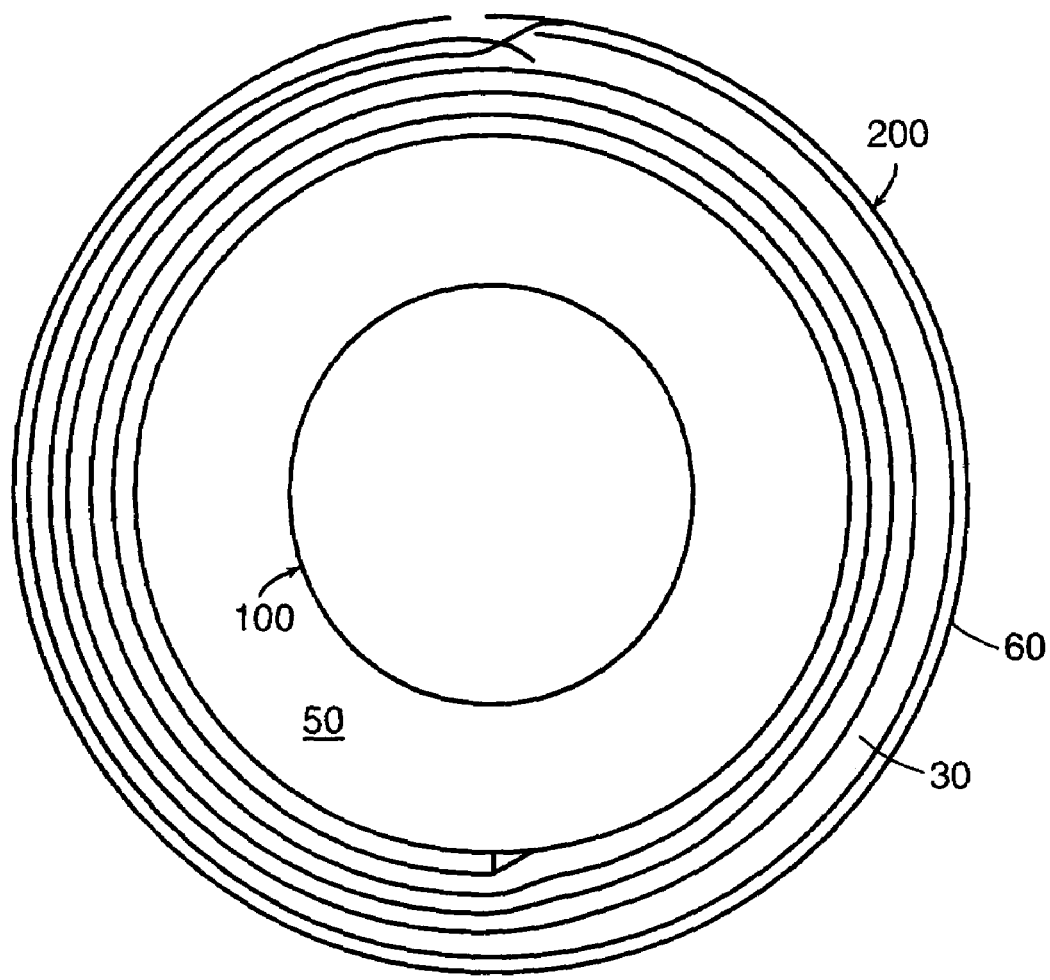
FIG. 1 is a top view of a prior art radial flux electric motor having a tape-wound amorphous metal stator and a rotor.

Referring to the drawings, there is shown in FIG. 1 a prior art radial flux motor 20 having a tape wound amorphous metal stator 200. The stator 200 is comprised of wound amorphous metal tape 30. A rotor 100 is disposed to rotate about an axis of rotation within the stator 200. The "toothless" configuration of the stator 200 defines a substantial air gap 50 between the stator 200 and rotor 100, which disadvantageously limits the performance and control of the motor 20.

Figure 2A:
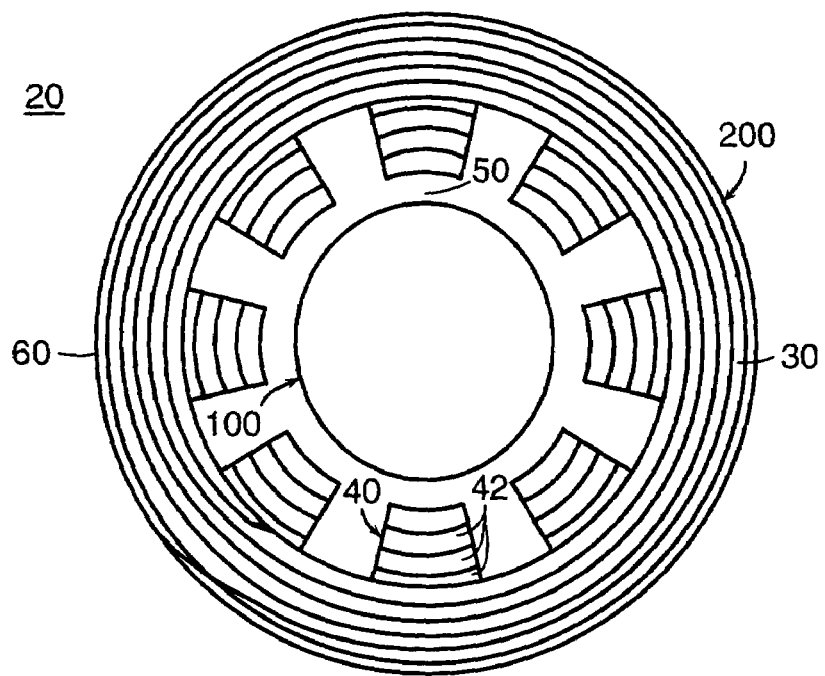
FIGS. 2A and 2B are top views of a prior art radial flux electric motor having a tape-wound amorphous metal stator with poles formed from stacks of cut amorphous metal.
Figure 2B:
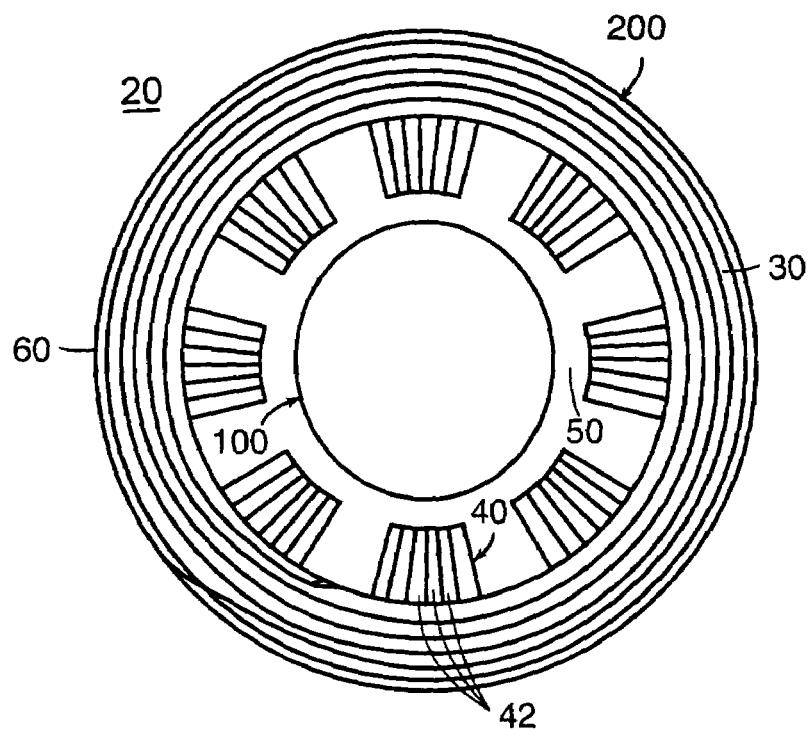

FIGS. 2A and 2B each depict a prior art radial flux motor 20 having an amorphous metal stator 200 comprised of wound amorphous metal tape 30 and having a rotor 100 disposed for rotation within the stator 200. The stator 200 includes teeth 40 or poles that extend radially inward toward the rotor 100. Each of the teeth 40 is comprised of a plurality of amorphous metal strips 42 that are oriented either generally parallel to (see, e.g. FIG. 2A) or generally perpendicular to (see, e.g. FIG. 2B) the winding direction of the wound metal tape 30. Although the air gap 50 defined between the rotor 100 and stator poles 40 is reduced when compared with the motor 20 of FIG. 1, the magnetic flux of the motor 20 must cross many layers of amorphous metal, i.e. traverse many air gaps, as the flux passes from the tooth 40 to the back-iron 60 of the stator 200. Furthermore, a substantial vector component of the flux emerging from tooth 40 enters back iron 60 in the direction generally normal to the plane of the layers of amorphous metal in back iron 60. Hence, the time variation of this component of flux induces substantial eddy currents in back iron 60 which, in turn, result in excessive core loss. Consequently, the operational current requirements and power consumption of a motor 20 configured as depicted in FIGS. 2A and 2B are significantly increased. In addition, the thermal characteristics of such a motor are also adversely impacted.

Figure 3:
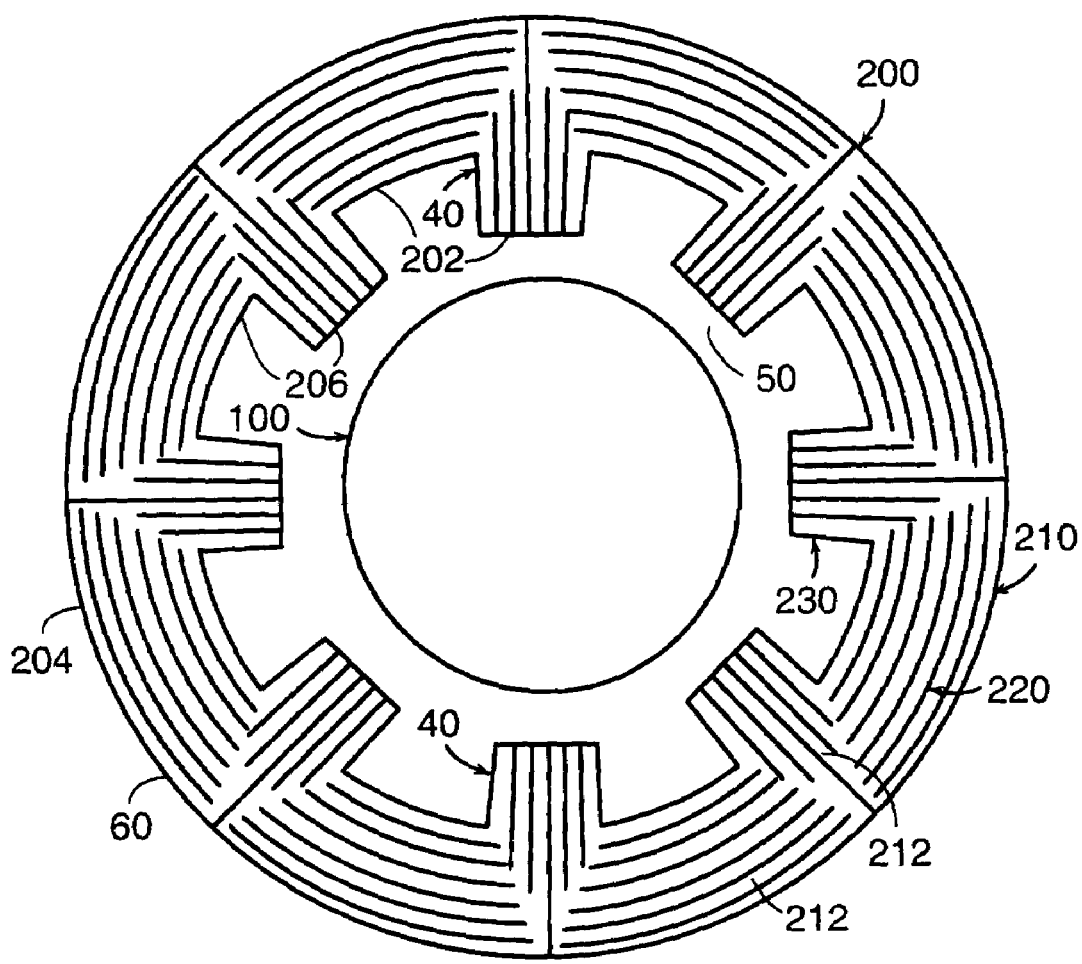
FIG. 3 is a top view of a first embodiment of a radial flux electric motor having an amorphous metal stator constructed of a plurality of segments configured in accordance with the present invention.
Figure 4A:
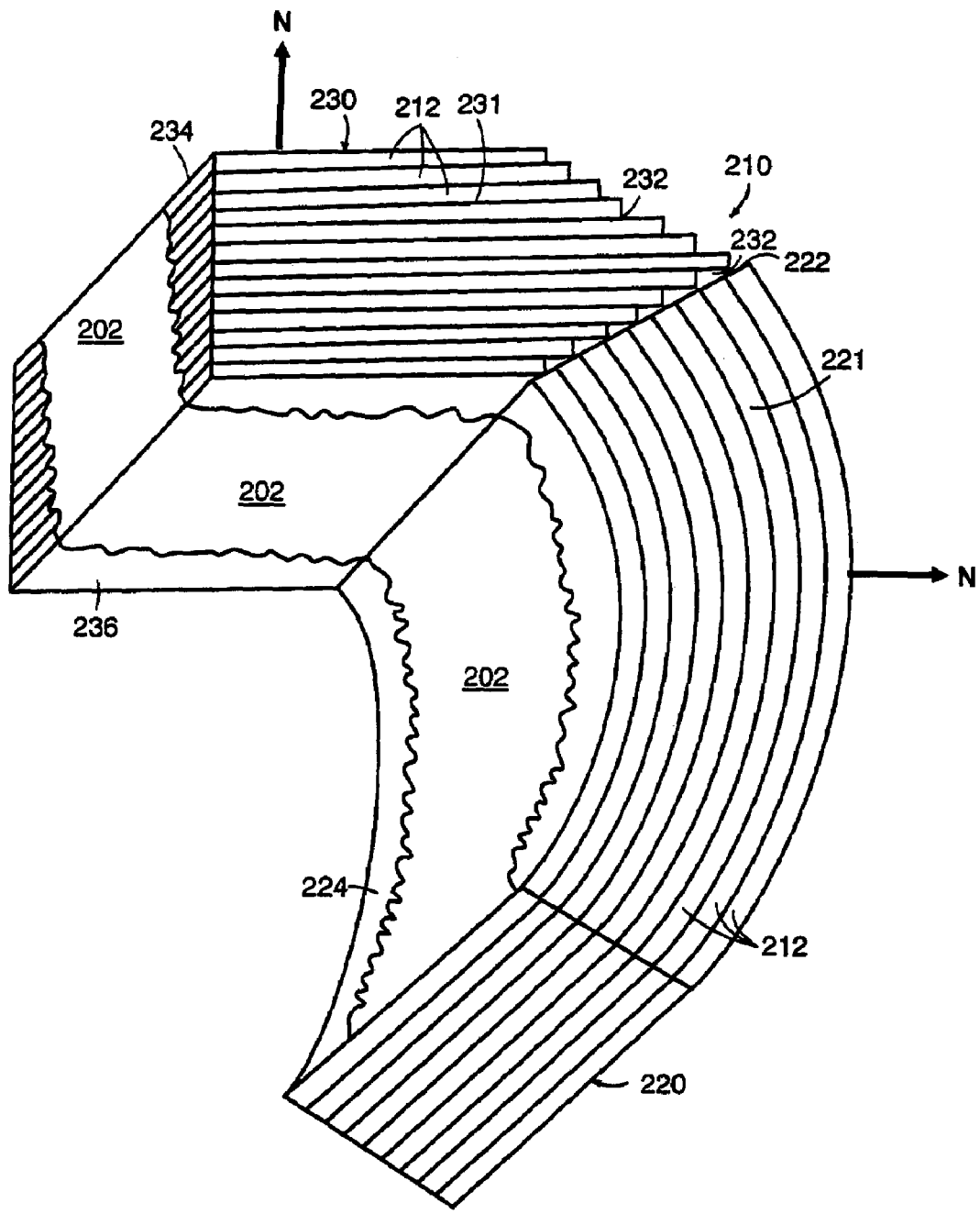
FIG. 4A is a detailed view of a segment of the stator of FIG. 3 showing a restraining mechanism comprised of a continuous band of epoxy around the inner surface of the stator.
Figure 4B:
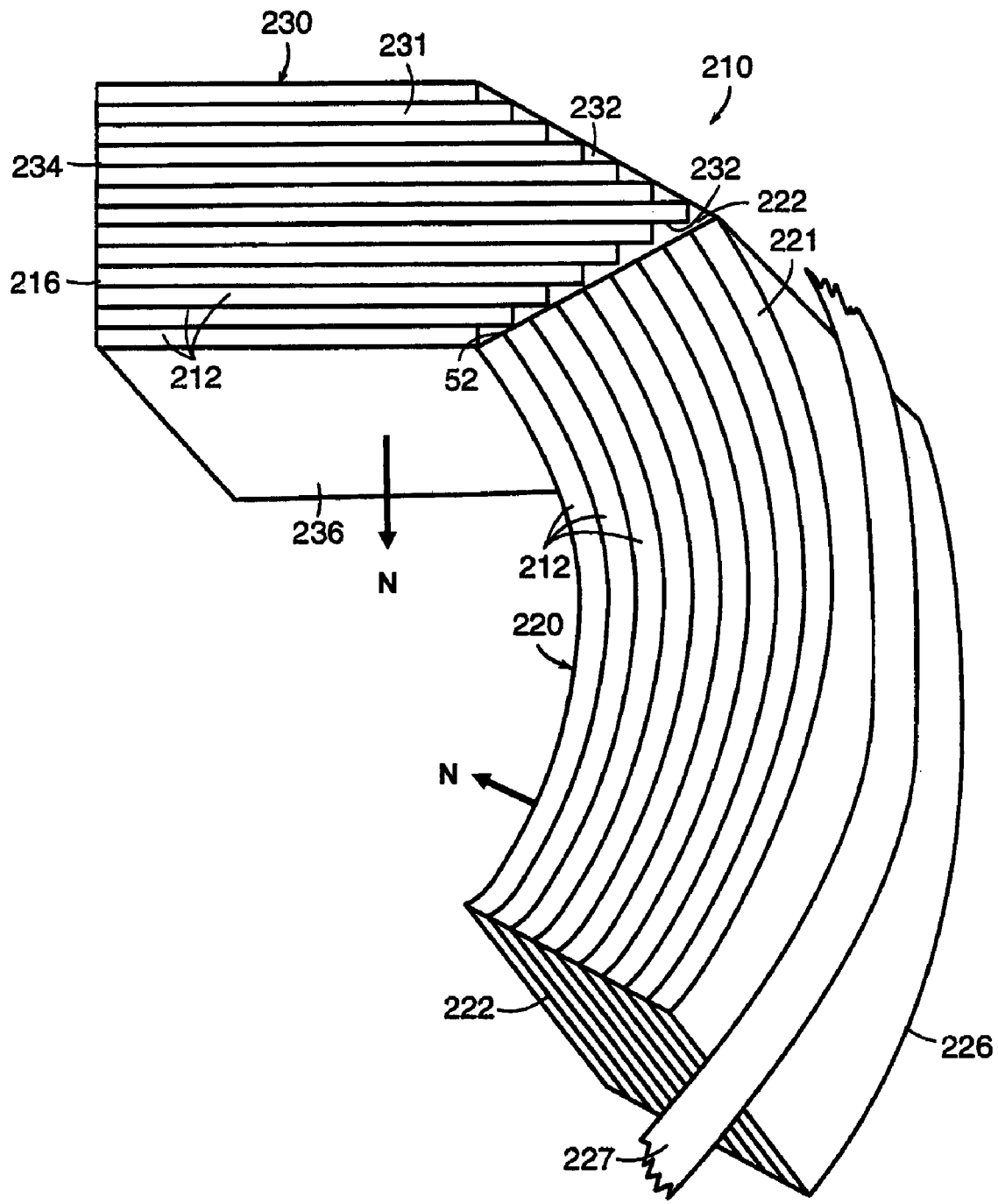
FIG. 4B is a detailed view of a segment of the stator of FIG. 3 showing a restraining mechanism comprised of a continuous metallic band around the outer circumference of the stator.

Referring next to FIGS. 3, 4A, and 4B there is shown a brushless radial flux DC motor 20 constructed in accordance with the present invention. Motor 20 has a rotor 100 rotatingly disposed within a first embodiment of an amorphous metal stator 200. The rotor 100 is rotatingly supported within the stator 200 by means known in the art. The stator 200 is made up of a predetermined number of segments 210 arranged in abutting relation with each other in a generally cylindrical form. Each segment 210 includes a back-iron section 220 and a tooth section 230 collectively comprising a plurality of layers of amorphous metal strips 212 that are individually cut to their respective predetermined sizes. Cutting is accomplished using known cutting methods, such as water jet, electro-discharge machining, electro-chemical means, and the like. Shearing provides a fast, inexpensive cutting means and is, accordingly, preferred. Each strip 212 of the back-iron section 220 is cut to a different predetermined size and stacked so that the longest strip is located along the outer diameter of the segment 210 and the shortest strip is located along the inner diameter of the segment 210. The cut strips 212 are stackingly arranged so that metal-to-metal contact is provided among the stacked amorphous metal strips 212. The stacked strips 212 are then subjected to a forming force that imparts a bow or arcuate bend to the stacked strips 212 as depicted in FIG. 4 (the various methods for forming the stacked strips are discussed hereinafter in further detail).

As depicted by FIGS. 4A and 4B of the drawings, strips 212 of the tooth section 230 are cut to a plurality of predetermined sizes and contactingly stacked to ensure metal-to-metal contact among the stacked strips so that the longest strip is located approximately at the center of the tooth section 230 and the strips 212 become shorter towards the outer edges of the group 230. This configuration defines two diametrically opposed first free ends 232 that collectively form a substantially V-shaped end of the tooth section 230. The stacked strips configured as described and as depicted by FIGS. 4A and 4B also define a second free end 234 of the tooth section 230 that is substantially planar and that comprises the tooth or pole 40 of the stator 200. Lines N depict directions normal to the surfaces of the amorphous ribbons comprised in tooth section 230 and back iron section 220, respectively.

The back-iron section 220 and tooth section 230 include respective first free ends 222, 232 that contactingly engage each other when the sections 220, 230 are arranged as depicted by FIGS. 4A and 4B to form a segment 210. An air gap 52 is defined between the free ends 222, 232 of the sections 220, 230 due to the fact that the sections 220, 230 comprise separate pieces of amorphous metal.

FIG. 4A further depicts an inner restraining mechanism which secures each tooth section 230 against being drawn out of engagement with the back iron section 224. The restraining mechanism comprises a continuous band of epoxy 202 which may be cast or molded to the shape of the inner circumference of the stator. Epoxy band 202 possesses sufficient strength to withstand the inward force exerted on it by the attraction of stator tooth section 230. In order to have sufficient strength, epoxy band 202 covers a substantial portion of the inner surface of the rotor, e.g., at least 50% of the surface area thereof. Preferably the band covers substantially all of the inner surface of each tooth 234, the side surfaces 236 of each tooth which are perpendicular to the back iron, and the inner surface of each back iron section 224. In addition, the epoxy may be applied to substantially the entire area of the top surfaces 231 and 221 of the tooth and back iron, respectively, and the bottom surfaces of each tooth and back iron section (not shown) to provide additional restraining support. It is preferred that the epoxy not cover the outer surfaces of the tooth sections 232 and the end surfaces of the back iron sections 222.

FIG. 4B depicts an outer restraining mechanism for securing the plurality of segments in generally circular abutting relation to each other. The restraining mechanism is comprised of a continuous metallic or epoxy band 227. Band 227 possesses sufficient strength to withstand the outward pressures exerted upon it by repulsion of the stator from the rotor. If metallic, band 227 must be cinched, welded, or otherwise secured to form a complete, continuous loop peripherally around the outer circumference of stator 200. In order to have sufficient strength band 227, if comprised of epoxy, should cover a substantial portion of the outer surface 226 of each back iron section, e.g., at least 50% of the surface area thereof. Preferably the epoxy band covers at least 70%, and most preferably substantially all of the outer surface.

Once arranged as depicted by FIGS. 4A and 4B, the segment 210 is annealed at a temperature of about 360° C. while being subjected to a magnetic field. As is well known by those skilled in the art, the annealing step operates to relieve stress in the amorphous metal material, including stresses imparted during the casting, winding, cutting, lamination arranging, forming and shaping steps. The segment 210 retains its formed shape after the annealing process.

Generally if epoxy is to be used for inner or outer restraining means, it must be applied after the heat treatment is accomplished. In this case, temporary fixturing is employed to secure the segments in the requisite geometrical shape and alignment during annealing.

Once a predetermined number of segments 210 are arranged to form the stator 200, as depicted in FIG. 3, the stator is coated or impregnated with an epoxy resin 202 to hold the segments 210 together, and also to provide mechanical strength and support to the stator 200 during use in the electric motor 20. The epoxy resin 202 is particularly effective in securing the tooth section 230, which also partly comprises the teeth or poles 40 of the stator 200, from being magnetically drawn toward the rotor 100. The epoxy resin 202 preferably covers the second free end 234 of the tooth section 230 and is not present between the first free ends 222, 232 of the first and tooth sections 220, 230. Alternatively, or in addition to the epoxy resin 202, an inner restraining band 206 may be used to secure the tooth section 230 in place and to supply the desired additional structural rigidity to the stator 200. The band 206 may secure the teeth or poles 40, the sections between the poles, or both, provided that the restraining band 206 does not significantly increase the space required between the rotor 100 and the stator teeth 40, i.e. does not significantly increase the air gap 50. An outer restraining band 204, preferably made of steel, is provided peripherally about the stator 200 to secure the plurality of segments 210 in generally circular abutting contact with each other. The outer band 204 strengthens the overall construction of the stator 200 and provides an additional level of safety in the case of catastrophic and destructive motor failure by preventing loose motor parts from breaking loose and causing injury to persons located nearby.

Use of an outer restraining means such as metallic or epoxy band 227 around the stator 200, as described above, also affords protection against small flakes of amorphous metal becoming detached and potentially becoming lodged in motor bearings, electrical windings or other locations where their presence would adversely affect motor operation.

The stator 200 depicted by FIG. 4B advantageously provides a flux path therethrough which includes a single air gap 52 that is crossed as the flux traverses each segment 210. Consequently, the performance and control characteristics of a stator 200 constructed in accordance with the present invention are significantly improved when compared with conventional amorphous metal stators for radial flux electric motors.

Figure 5:
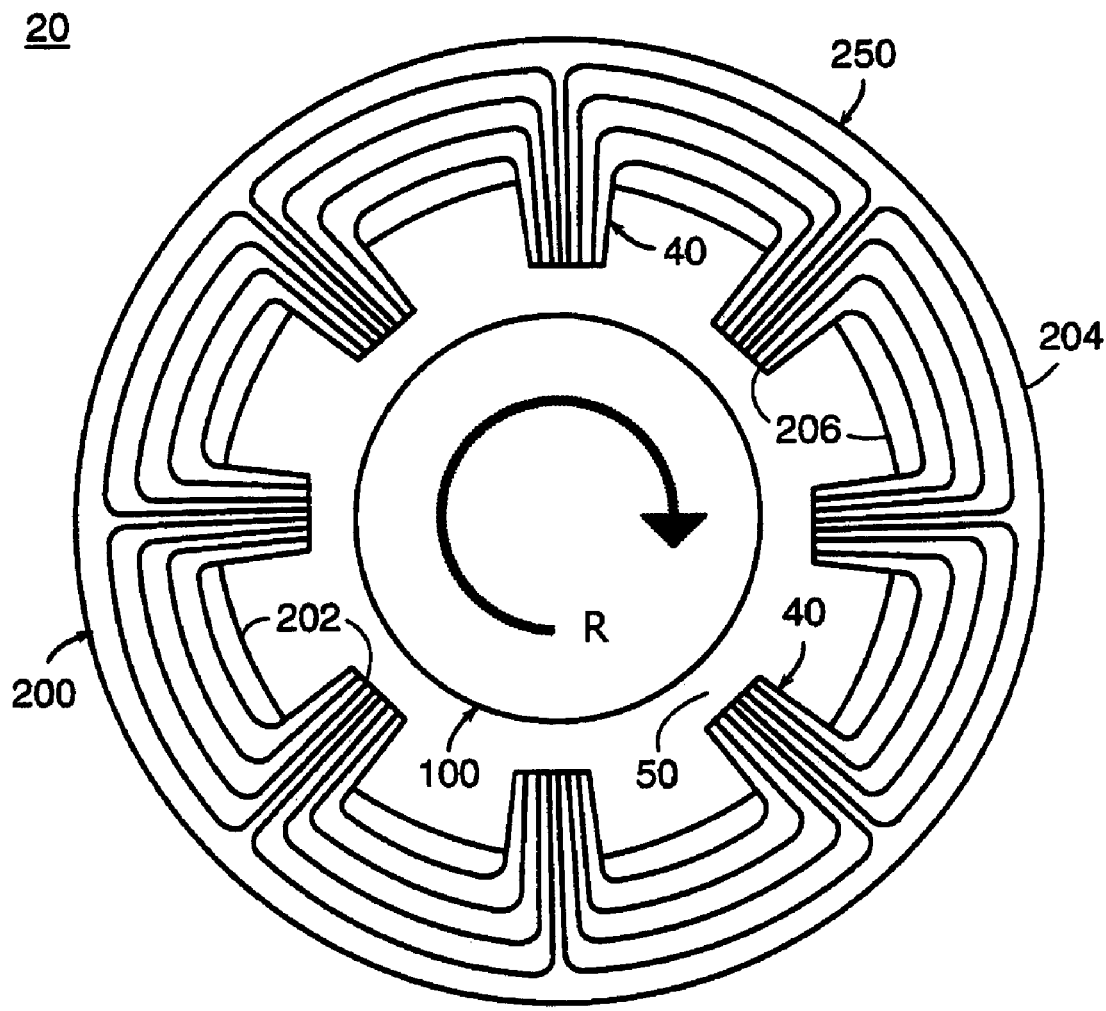
FIG. 5 is a top view of a second embodiment of a radial flux electric motor having an amorphous metal stator constructed of a plurality of segments and configured in accordance with the present invention.
Figure 6:
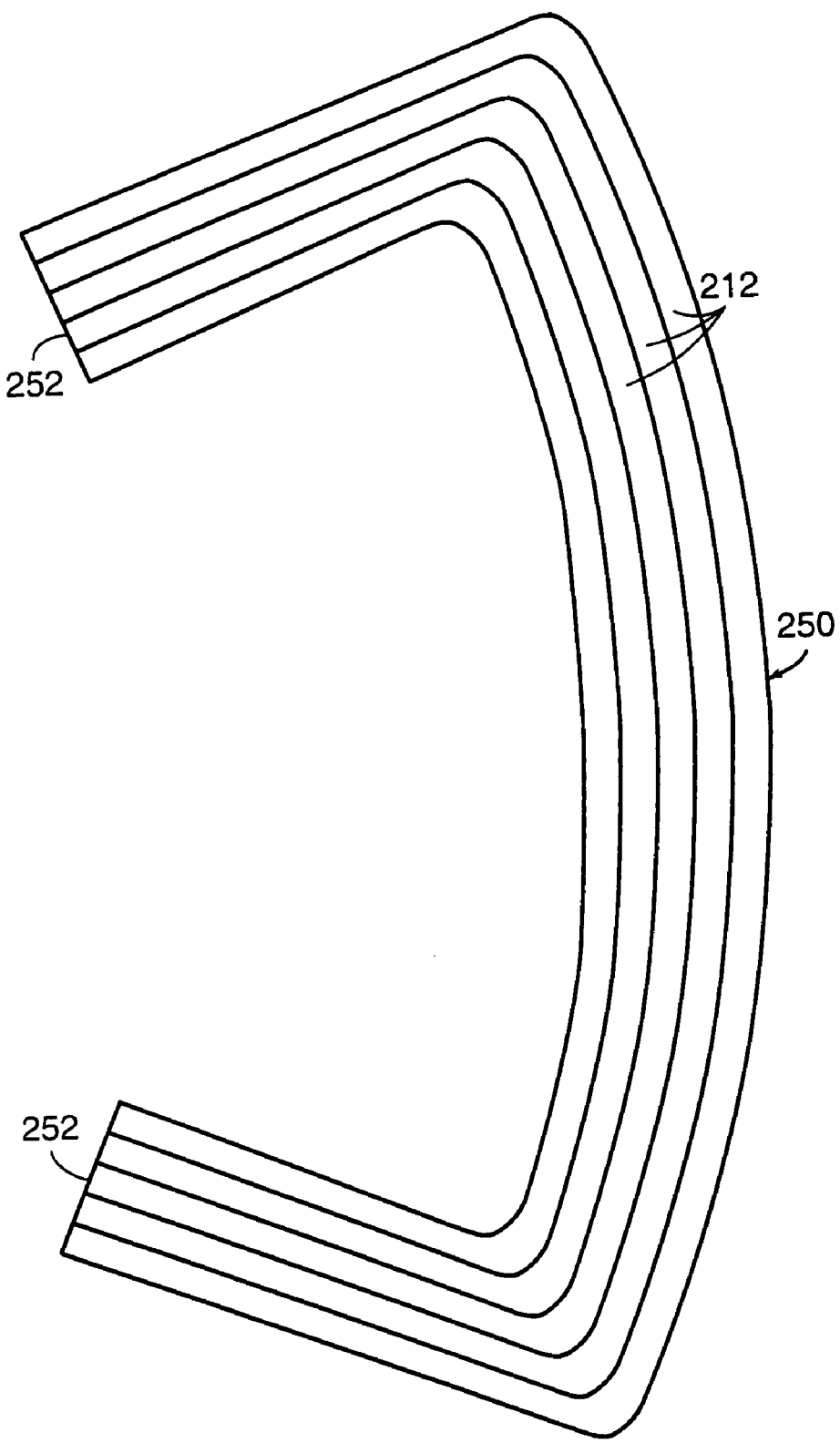
FIG. 6 is a detailed view of a segment of the stator of FIG. 5.

Referring to FIGS. 5 and 6, there is shown a second embodiment of the stator 200 of the present invention. Rotor 100 is appointed to rotate as depicted about an axis centrally located in the rotor and perpendicular to the plane of FIG. 5. Stator 200 is made up of a predetermined number of segments 250 that are generally C-shaped (when viewed in cross-section, as in FIG. 6) and that are arranged in abutting relation with each other in a generally cylindrical form. Each C-segment 250 is comprised of a plurality of layers of amorphous metal strips 212 that are individually cut to their respective predetermined sizes and thereafter formed to the desired shape. The strips 212 are stackingly arranged so that metal-to-metal contact is provided among the stacked amorphous metal strips 212. Two substantially planar free ends 252 are defined by each C-segment 250 that comprise, at least in part, the poles 40 of the stator 200. After being formed, the C-segments 250 are individually annealed at temperatures of about 360° C. while being subjected to a magnetic field. The C-segments 250 retain their formed shape after the annealing process. Once a predetermined number of C-segments 250 are arranged to form the stator 200, as depicted in FIG. 5, the stator 200 is coated or impregnated with an epoxy resin 202 to hold the C-segments 250 together, and also to provide mechanical strength and support to the stator 200 during use in the electric motor 20. The epoxy resin 202 optionally covers the two free ends 252 of the C-segment 250. Alternatively, or in addition to the epoxy resin 202, an inner restraining band 206 may be used to secure the C-segments 250 in place and to supply the desired additional structural rigidity to the stator 200. The band 206 may secure the teeth or poles 40, the sections between the poles, or both, provided that the inner restraining band 206 does not significantly increase the space required between the rotor 100 and the stator teeth 40, i.e. does not significantly increase the air gap 50, an outer restraining band 204, preferably made of steel, is provided peripherally about the stator 200 to secure the plurality of C-segments 250 in generally circular abutting relation with each other. The outer band 204 strengthens the overall construction of the stator 200 and provides an additional level of safety in the case of catastrophic and destructive motor failure by preventing loose motor parts from breaking loose and causing injury to persons located nearby.

The C-segments 250 formed in accordance with the present invention are annealed at a temperature of about 360° C. while being subjected to a magnetic field. As is well known to those skilled in the art, the annealing step operates to relieve stress in the amorphous metal material, including stresses imparted during the casting, winding, cutting, lamination arranging, forming and shaping steps. The C-segment 250 retains its formed shape after the annealing process.

The inventive stator 200 depicted in FIG. 5 advantageously permits flux to traverse each C-segment 250 without having to cross an air gap. Consequently, the performance and control characteristics of a stator 200 constructed in accordance with the present invention are significantly improved when compared with conventional amorphous metal stators for radial flux electric motors.

Figure 7A:
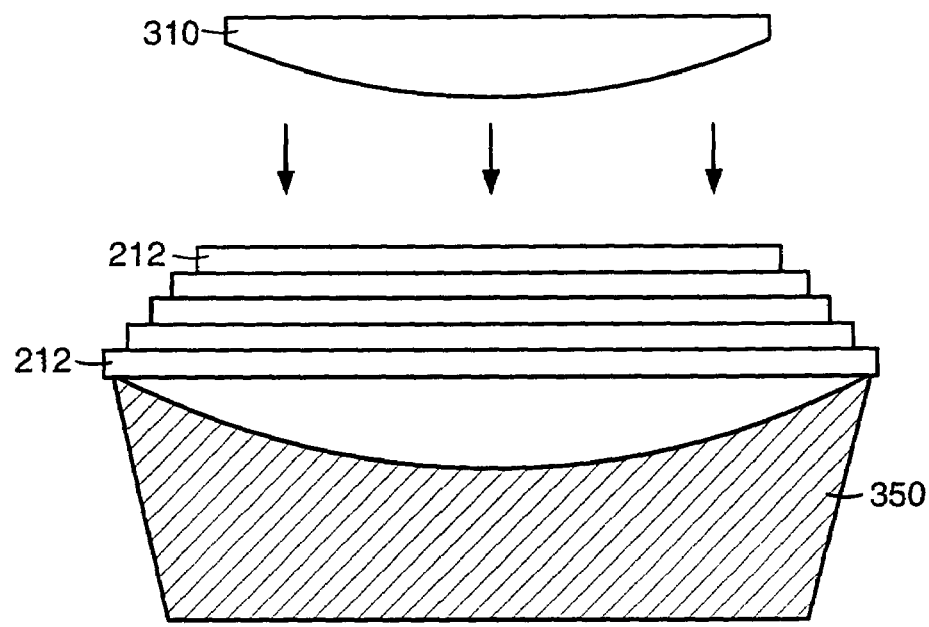
FIGS. 7A–7E depict methods of constructing an amorphous metal stator in accordance with the present invention.

Referring FIG. 7A of the drawings, there is shown a method for forming a generally arcuate back-iron section 220 of an amorphous metal stator segment 210 in accordance a first embodiment of the present invention. The back-iron section 220 is constructed from a plurality of amorphous metal strips 212 that are cut to a plurality of predetermined lengths from spools (not shown) of amorphous metal, as depicted in FIG. 7A. The cut strips 212 are stacked and bound together (ensuring that metal-to-metal contact is present among the strips 212) to form the back-iron section 220. The back-iron section 220 is then formed to the desired shape by imparting a forming force in the direction generally indicated by the arrows using a die 350 and a forming means 310. The formed back-iron section 220 and substantially straight tooth section 230 are then arranged as depicted in FIG. 4 and annealed.

Figure 7B:
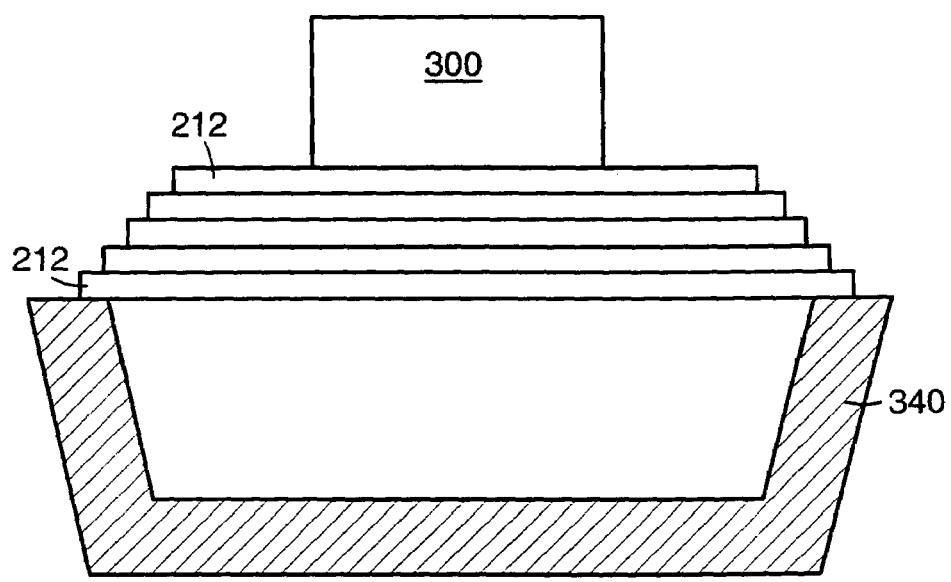
Figure 7C:
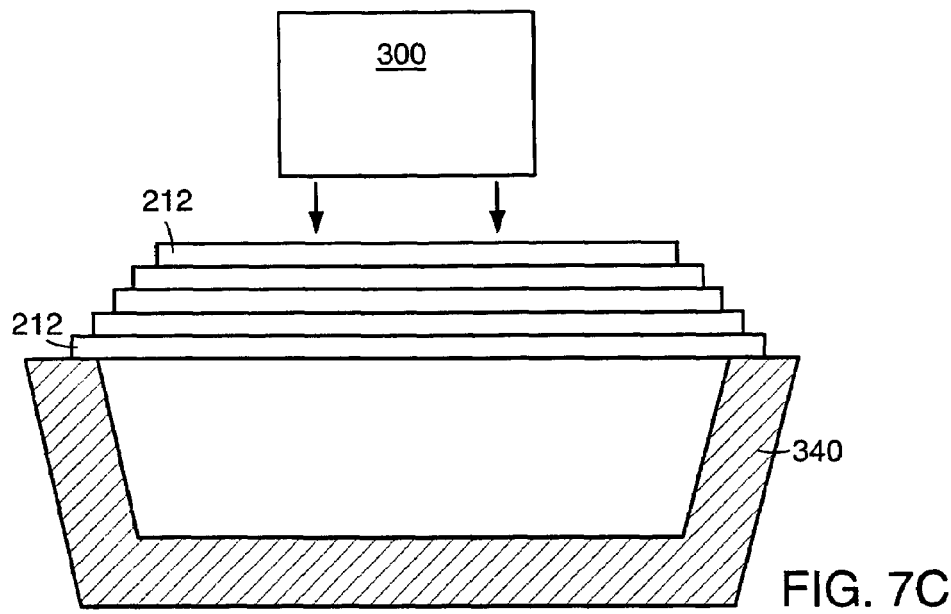

Referring to FIGS. 7B and 7C, two methods of forming a C-segment. 250 of an amorphous metal stator in accordance with a second embodiment of the present invention are there depicted. Strips of amorphous metal ribbon are measured from spools (not shown) of amorphous metal and cut to predetermined lengths. The cut strips 212 are then stacked, ensuring metal-to-metal contact among the strips, and then secured to a generally rectangular mandrel 300. For the C-segment 250, the strips 212 may be formed into the desired shape using a "punch and die" concept. More specifically, the strips 212 are strapped around the generally rectangular mandrel 300 with the mandrel 300 being the punch and the corresponding die 340 having a generally C-shaped cross-section. The mandrel 300 and attached stacked strips 212 are then directed into the die to impart the desired C-shape to the strips 212 and form the C-segment 250. Alternately, and as depicted in FIG. 7C, the stacked strips 212 may first be placed on the generally C-shaped die 340, and the generally rectangular mandrel 300 thereafter directed onto the stacked strips 212 to impart the desired cross-sectional shape and form the C-segment 250.

The forming method depicted in FIGS. 7B and 7C may also be used with spools of amorphous metal that comprise multiple layers of pre-stacked metal ribbon. This pre-stacked ribbon is cut and formed as described above.

Figure 7D:
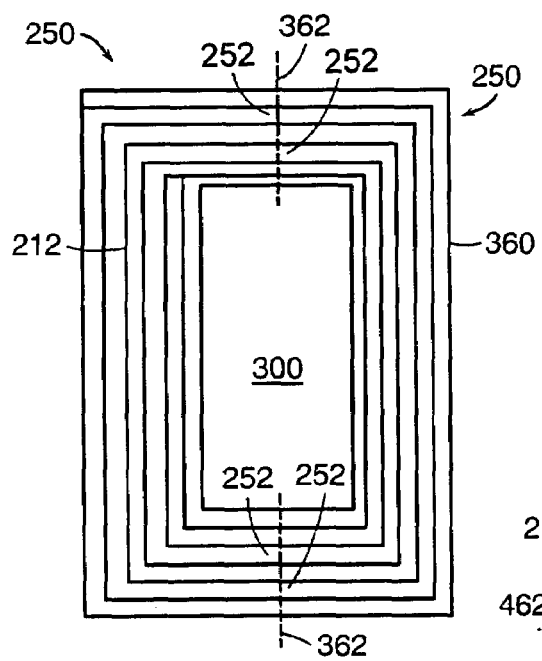
Figure 7E:
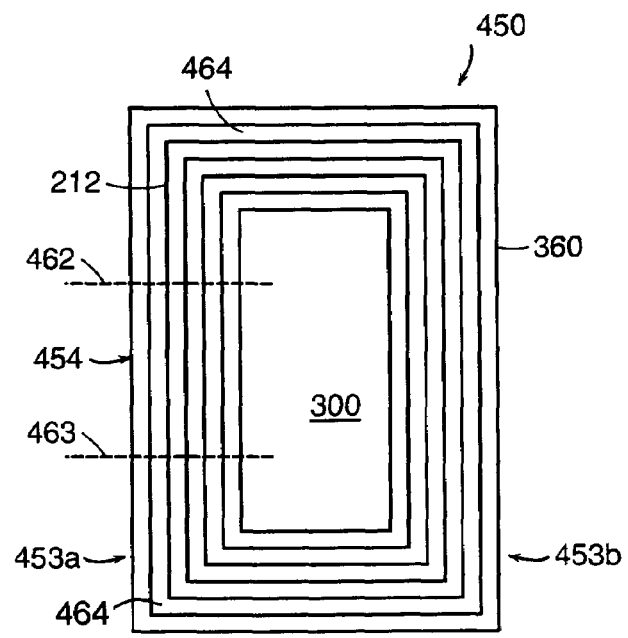

Yet another method of forming C-segment 250 or 450 comprises winding one or more strips 212 of amorphous metal ribbon about a generally rectangular mandrel 300 to form a generally rectangular core 360 having a large aspect ratio, i.e. the ratio of the length of the long side of the rectangle to the length of the short side, as depicted in FIGS. 7D and 7E. The aspect ratio is preferably about 3-to-1. One embodiment of this method is depicted in FIG. 7D, showing that the short sides of the rectangular core are cut approximately at the longitudinal mid-point 362 to provide two C-segments 250, i.e. one from each half of the generally rectangular core. The C-segments 250 may thereafter be annealed and sealed with an epoxy resin as described above. In this embodiment the faces 252 of each segment 250 are approximately co-planar. Alternatively, as illustrated in FIG. 7E, a C-segment 450 whose faces 464 are in two approximately parallel planes may be formed by removing a portion 454 of long side 453*a* of generally rectangular core 360. The other long side 453*b* is left intact. Portion 454 has the approximate shape of a rectangular prism and is removed by making cuts 462 and 463 in long side 453*a*.

The segments 210, 250, or 450 can be annealed with conventional heat treatment equipment such as batch or continuous furnace. Application of the magnetic field utilized in the anneal can be accomplished through use of circular current coils, which provide a longitudinal magnetic field when the segments are positioned therewithin. When the profile of the segments is flat (e.g. as with the tooth section 230), direct contact heating plates can also be used, practically and economically, for annealing. Also, the non-annulus, flat shape of the tooth section 230 will facilitate improved annealing cycle with faster heat up and cool down time as compared to the conventional techniques. Furthermore, the annealing cycle time and temperature can be tailored to individual segments of varying shape, size and properties to achieve an optimum level of material ductility and magnetic performance. In effect, the resulting loss of the segments produced in accordance with the present invention will be lower than the conventional wound amorphous metal stators from lower induced stress during the segment forming process and also the improved stress relieving affect of annealing. The reduction in annealing cycle time will reduce the brittleness of the annealed amorphous metal stator segment laminations.

After annealing, the free ends 234, 252, and 464 and inner and outer peripheral edges of the segment 210 or C-segments 250 and 450 are optionally finished with an epoxy resin coating. The epoxy resin coating 202 is completed on both interior and exterior edges to provide mechanical strength and surface protection for the transformer coil during the stator assembly process and during use as a component part of a radial flux electric motor.

It will be understood by those skilled in the art that radial flux motors may comprise one or more rotors and one or more stators. Accordingly, the terms "a rotor" and "a stator" as used herein with reference to motors mean a number of rotors and stators ranging from 1 to as many as three or more. It will also be recognized by those skilled in the art that the term "electric motor", as used herein, refers generically to a variety of rotating electrical machines which additionally comprise electric generators as well as regenerative motors that may be operated optionally as electric generators. The amorphous metal stator of the invention may be employed in constructing any of these devices. The advantages recognized by the present invention include simplified manufacturing and reduced manufacturing time, reduced stresses (i.e., magnetostrictive) encountered during construction of amorphous metal components, reduced core loss, and optimized performance of the finished amorphous metal stator.

The amorphous metal stator 200 of the present invention can be manufactured using numerous amorphous metal alloys. Generally stated, the alloys suitable for use in component 10 are defined by the formula: $M_{70-85} Y_{5-20} Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta, Hf, Ag, Au, Pd, Pt, and W, (ii) up to ten (10) atom percent of components (Y+Z) can be replaced by at least one of the non-metallic species In, Sn, Sb and Ph, and (iii) up to about one (1) atom percent of the components (M+Y+Z,) can be incidental impurities. As used herein, the term "amorphous metallic alloy" means a metallic alloy that substantially lacks any long range order and is characterized by X-ray diffraction intensity maxima which are qualitatively similar to those observed for liquids or inorganic oxide glasses.

Amorphous metal alloys suitable for the practice of the invention are commercially available, generally in the form of continuous thin strip or ribbon in widths up to 20 cm or more and in thicknesses of approximately 20–25 μm. These alloys are formed with a substantially fully glassy microstructure (e.g., at least about 80% by volume of material having a non-crystalline structure). Preferably the alloys are formed with essentially 100% of the material having a non-crystalline structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M" is iron, "Y" is boron and "Z" is silicon. For this reason, amorphous metal strip composed of an iron-boron-silicon alloy is preferred. More specifically, it is preferred that the alloy contain at least 70 atom percent Fe, at least 5 atom percent B, and at least 5 atom percent Si, with the proviso that the total content of B and Si be at least 15 atom percent. Most preferred is amorphous metal strip having a composition consisting essentially of about 11 atom percent boron and about 9 atom percent silicon, the balance being iron and incidental impurities. This strip is sold by Honeywell International Inc. under the trade designation METLAS® alloy 2605SA-1.

As noted above, the magnetic properties of the amorphous metal strip appointed for use in amorphous metal stator 200 of the present invention may be enhanced by thermal treatment at a temperature and for a time sufficient to provide the requisite enhancement without altering the substantially fully glassy microstructure of the strip. The heat treatment comprises a heating portion, an optional soak portion and a cooling portion. A magnetic field may optionally be applied to the strip during at least a portion, and preferably during at least the cooling portion, of the heat treatment. Application of a field, preferably along the direction in which flux lies during operation of the stator, further improves magnetic properties of the stator and reduces its core loss.

The magnetic properties of certain amorphous alloys suitable for use in amorphous metal stator 200 may be significantly improved by heat treating the alloy to form a nanocrystalline microstructure. This microstructure is characterized by the presence of a high density of grains having average size less than about 100 nm, preferably less than 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of stator 200. The heat treatment needed to produce the nanocrystalline structure in a given alloy must be carried out at a higher temperature or for a longer time than would be needed for a heat treatment designed to preserve therein a substantially fully glassy microstructure. As used herein the terms amorphous metal and amorphous alloy further include a material initially formed with a substantially fully glassy microstructure and subsequently transformed by heat treatment or other processing to a material having a nanocrystalline microstructure. Amorphous alloys which may be heat treated to form a nanocrystalline microstructure are also often termed, simply, nanocrystalline alloys. The present method allows a nanocrystalline alloy to be formed into the requisite geometrical shape of the finished stator. Such formation is advantageously accomplished while the alloy is still in its as-cast, ductile, substantially non-crystalline form; before it is heat-treated to form the nanocrystalline structure which generally renders it more brittle and more difficult to handle.

Two preferred classes of alloy having magnetic properties significantly enhanced by formation therein of a nanocrystalline microstructure are given by the following formulas in which the subscripts are in atom percent.

A first preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8. After this alloy is heat treated to form a nanocrystalline microstructure therein, it has high saturation induction (e.g., at least about 1.5 T), low core loss, and low saturation magnetostriction (e.g. a magnetostriction having an absolute value less than $4 \times 10^{-6}$). Such an alloy is especially preferred for applications wherein a motor of minimum size for the required power and torque is demanded.

A second preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18. After this alloy is heat treated to form a nanocrystalline microstructure therein, it has a saturation induction of at least about 1.0 T, an especially low core loss, and low saturation magnetostriction (e.g. a magnetostriction having an absolute value less than $4 \times 1^{-6}$). Such an alloy is especially preferred for use in a motor required to operate at very high speed (e.g., requiring an excitation frequency of 1000 Hz or more).

An amorphous metal stator will magnetize and demagnetize more efficiently than a stator made from other iron-base magnetic metals. When operated in an electric motor, the amorphous metal stator will generate less heat than a comparable component made from another iron-base magnetic metal when the two components are magnetized at identical induction and frequency. The electric motor using the amorphous metal stator can therefore be designed to operate 1) at a lower operating temperature; 2) at higher induction to achieve reduced size and weight; or, 3) at higher frequency to achieve reduced size and weight, or to achieve superior motion control, when compared to electric motors using components made from other iron-base magnetic metals.

As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement the excitation is generally chosen such that the magnetic induction varies sinusoidally with time at a frequency "f" and with a peak amplitude $B_{max}$. The core loss is then determined by known electrical measurement instrumentation and techniques. Loss is conventionally reported as watts per unit mass or volume of the magnetic material being excited. It is known in the art that loss increases monotonically with f and $B_{max}$. Most standard protocols for testing the core loss of soft magnetic materials used in components of motors {e.g. ASTM Standards A912–93 and A927(A927M-94)} call for a sample of such materials which is situated in a substantially closed magnetic circuit, i.e. a configuration in which closed magnetic flux lines are completely contained within the volume of the sample. On the other hand, a magnetic material as employed in a motor stator is situated in a magnetically open circuit, i.e. a configuration in which magnetic flux lines must traverse an air gap. Because of fringing field effects and non-uniformity of the field, a given material tested in an open circuit generally exhibits a higher core loss, i.e. a higher value of watts per unit mass or volume, than it would have in a closed-circuit measurement. The amorphous metal stator of the invention advantageously exhibits low core loss over a wide range of flux densities and frequencies even in an open-circuit configuration.

An amorphous metal stator 200 constructed in accordance with the present invention and excited at an excitation frequency "f" to a peak induction level "$B_{max}$" will have a core loss at room temperature less than "L" wherein 1, is given by the formula $L = 0.0074\ f\ (B_{max})^{1.3} + 0.000282\ f^{1.5} (B_{max})^{2.4}$, the core loss, the excitation frequency and the peak induction level being measured in watts per kilogram, hertz, and teslas, respectively. In a preferred embodiment, the magnetic component has (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 12 watts-per-kilogram of amorphous metal material when operated at a frequency of approximately 1000 Hz and at a flux density of approximately 1.0 T, or (iii) a core-loss of less than or approximately equal to 70 watt-per-kilogram of amorphous metal material when operated at a frequency of approximately 20,000 Hz and at a flux density of approximately 0.30 T. The reduced core loss of the component of the invention advantageously improves the efficiency of an electrical device comprising it.

The low values of core loss make the amorphous metal stator of the invention especially suited for use in motors wherein a high pole count or a high rotational speed necessitates a high frequency magnetic excitation, e.g., excitation at above 100 Hz. The inherent high core loss of conventional steels at high frequency renders them unsuitable for use in such motors requiring high frequency excitation. These core loss performance values apply to the various embodiments of the present invention, regardless of the specific geometry of the amorphous metal stator.

Without being bound by any theory, it is believed that the total core loss of the low-loss amorphous metal stator of the invention is comprised of contributions from hysteresis losses and eddy current losses. Each of these two contributions is a function of the peak magnetic induction $B_{max}$ and of the excitation frequency f. Prior art analyses of core losses in amorphous metals (see, e.g., G. E. Fish, J. Appl. Phys. 57, 3569(1985) and G. E. Fish et al., J. Appl. Phys. 64, 5370 (1988)) have generally been restricted to data obtained for material in a closed magnetic circuit.

The total core loss $L(B_{max}, f)$ per unit mass of the amorphous metal stator of the invention may be essentially defined by a function having the form $$L(B_{max},\ f) = c_1 f(B_{max})^n + c_2 f^q (B_{max})^m$$

wherein the coefficients c, and c, and the exponents n, m, and q must all be determined empirically, there being no known theory that precisely determines their values. Use of this formula allows the total core loss of the bulk magnetic component of the invention to be determined at any required operating induction and excitation frequency. It is generally found that in the particular geometry of a motor rotor or stator the magnetic field therein is not spatially uniform. Techniques such as finite element modeling are known in the art to provide an estimate of the spatial and temporal variation of the peak flux density that closely approximates the flux density distribution measured in an actual motor or generator. Using as input a suitable empirical formula giving the magnetic core loss of a given material under spatially uniform flux density these techniques allow the corresponding actual core loss of a given component in its operating configuration to be predicted with reasonable accuracy.

The measurement of the core loss of the magnetic component of the invention can be carried out using various methods known in the art. A method especially suited for measuring the present component may be described as follows. The method comprises forming a magnetic circuit with the magnetic component of the invention and a flux closure structure means. Optionally the magnetic circuit may comprise a plurality of magnetic components of the invention and a flux closure structure means. The flux closure structure means preferably comprises soft magnetic material having high permeability and a saturation flux density at least equal to the flux density at which the component is to be tested. Preferably, the soft magnetic material has a saturation flux density at least equal to the saturation flux density of the component. The flux direction along which the component is to be tested generally defines first and second opposite faces of the component. Flux lines enter the component in a direction generally normal to the plane of the first opposite face. The flux lines generally follow the plane of the amorphous metal strips, and emerge from the second opposing face. The flux closure structure means generally comprises a flux closure magnetic component which is constructed preferably in accordance with the present invention but may also be made with other methods and materials known in the art. The flux closure magnetic component also has first and second opposing faces through which flux lines enter and emerge, generally normal to the respective planes thereof. The flux closure component opposing faces are substantially the same size and shape to the respective faces of the magnetic component to which the flux closure component is mated during actual testing. The flux closure magnetic component is placed in mating relationship with its first and second faces closely proximate and substantially proximate to the first and second faces of the magnetic component of the invention, respectively. Magnetomotive force is applied by passing current through a first winding encircling either the magnetic component of the invention or the flux closure magnetic component. The resulting flux density is determined by Faraday's law from the voltage induced in a second winding encircling the magnetic component to be tested. The applied magnetic field is determined by Ampere's law from the magnetomotive force. The core loss is then computed from the applied magnetic field and the resulting flux density by conventional methods.

Referring to FIG. 7E, there is illustrated a testing method suitable for determining the core loss of C-shaped segment 450. Portion 454 removed from core 360 serves as the flux closure structure means. Cut surfaces formed by cutting core 360 to remove a portion 454 of long side 453a define the opposite faces 464 of the magnetic component and the opposite faces of the flux closure magnetic component. For testing, long side portion 454 is situated with its faces closely proximate and parallel to the corresponding faces 464 defined by the cuts 462 and 463. The faces of C-shaped segment 450 are substantially the same in size and shape as the faces of the flux closure magnetic component. Two copper wire windings (not shown) encircle C-shaped segment 450. An alternating current of suitable magnitude is passed through the first winding to provide a magnetomotive force that excites segment 450 at the requisite frequency and peak flux density. Flux lines in C-shaped segment 450 and in the flux closure magnetic component are generally within the plane of strips 212 and directed circumferentially. Voltage indicative of the time varying flux density within C-shaped segment 450 is induced in the second winding. Core loss is determined by conventional electronic means from the measured values of voltage and current.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Preparation and Electro-Magnetic Testing of an Amorphous Metal Stator $Fe_{80}B_{11}Si_9$ amorphous metal ribbon, approximately 60 mm wide and 0.022 mm thick, is wrapped around a rectangular mandrel or bobbin having dimensions of approximately 25 mm by 90 mm. Approximately 800 wraps of amorphous metal ribbon are wound around the mandrel or bobbin producing a rectangular core form having inner dimensions of approximately 25 mm by 90 mm and a build thickness of approximately 20 mm. The core/bobbin assembly is annealed in a nitrogen atmosphere. The anneal consists of: 1) heating the assembly up to 365° C.; 2) holding the temperature at approximately 365° C. for approximately 2 hours; and, 3) cooling the assembly to ambient temperature. The rectangular, wound, amorphous metal core is removed from the core/bobbin assembly. The core is vacuum impregnated with an epoxy resin solution. The bobbin is replaced, and the rebuilt, impregnated core/bobbin assembly is cured at 120° C. for approximately 4.5 hours. When fully cured, the core is again removed from the core/bobbin assembly. The resulting rectangular, wound, epoxy bonded, amorphous metal core weighs approximately 2100 g.

A C-shaped section of an amorphous metal stator is obtained by removing a rectangular prism 60 mm long by 40 mm wide by 20 mm thick (approximately 800 layers) from one of the long sides of the rectangular, wound, epoxy bonded, amorphous metal core. The prism is removed by cutting it from the epoxy bonded amorphous metal core with a 1.5 mm thick cutting blade. The cut surfaces of the rectangular prism and the remaining section of the core are etched in a nitric acid/water solution and cleaned in an ammonium hydroxide/water solution.

The rectangular prism and the C-shaped section which remains of the core are then reassembled into a full, cut core form. Primary and secondary electrical windings are fixed to the C-shaped section of the core. The cut core form are electrically tested at room temperature at 60 Hz, 1,000 Hz, 5,000 Hz and 20,000 Hz and compared to catalogue values for other ferromagnetic materials in similar test configurations [National Arnold Magnetics, 17030 Muskrat Avenue, Adelanto, Calif. 92301 (1995)]. The results are compiled below in Tables 1, 2, 3 and 4.

TABLE 1

Core Loss @ 60 Hz (W/kg)

| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
|---|---|---|---|---|---|
| 0.3 T | 0.10 | 0.2 | 0.1 | 0.1 | 0.06 |
| 0.7 T | 0.33 | 0.9 | 0.5 | 0.4 | 0.3 |
| 0.8 T |  | 1.2 | 0.7 | 0.6 | 0.4 |
| 1.0 T |  | 1.9 | 1.0 | 0.8 | 0.6 |
| 1.1 T | 0.59 |  |  |  |  |
| 1.2 T |  | 2.6 | 1.5 | 1.1 | 0.8 |
| 1.3 T | 0.75 |  |  |  |  |
| 1.4 T | 0.85 | 3.3 | 1.9 | 1.5 | 1.1 |

TABLE 2

Core Loss @ 1,000 Hz (W/kg)

| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
|---|---|---|---|---|---|
| 0.3 T | 1.92 | 2.4 | 2.0 | 3.4 | 5.0 |
| 0.5 T | 4.27 | 6.6 | 5.5 | 8.8 | 12 |
| 0.7 T | 6.94 | 13 | 9.0 | 18 | 24 |
| 0.9 T | 9.92 | 20 | 17 | 28 | 41 |
| 1.0 T | 11.51 | 24 | 20 | 31 | 46 |
| 1.1 T | 13.46 |  |  |  |  |
| 1.2 T | 15.77 | 33 | 28 |  |  |
| 1.3 T | 17.53 |  |  |  |  |
| 1.4 T | 19.67 | 44 | 35 |  |  |

TABLE 3

Core Loss @ 5,000 Hz (W/kg)

| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
|---|---|---|---|---|
| 0.04 T | 0.25 | 0.33 | 0.33 | 1.3 |
| 0.06 T | 0.52 | 0.83 | 0.80 | 2.5 |
| 0.08 T | 0.88 | 1.4 | 1.7 | 4.4 |
| 0.10 T | 1.35 | 2.2 | 2.1 | 6.6 |
| 0.20 T | 5 | 8.8 | 8.6 | 24 |
| 0.30 T | 10 | 18.7 | 18.7 | 48 |

TABLE 4

Core Loss @ 20,000 Hz (W/kg)

| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
|---|---|---|---|---|
| 0.04 T | 1.8 | 2.4 | 2.8 | 16 |
| 0.06 T | 3.7 | 5.5 | 7.0 | 33 |
| 0.08 T | 6.1 | 9.9 | 12 | 53 |
| 0.10 T | 9.2 | 15 | 20 | 88 |
| 0.20 T | 35 | 57 | 82 |  |
| 0.30 T | 70 | 130 |  |  |

As shown by the data in Tables 3 and 4, the core loss of the stator section is particularly low at excitation frequencies of 5000 Hz or more. Thus, the amorphous metal stator of the invention is especially suited for use in high-speed motors.

EXAMPLE 2

High Frequency Behavior of a Low-Loss Amorphous Metal Stator

The core loss data taken in Example 1 above are analyzed using conventional non-linear regression methods. It is determined that the core loss of a low-loss amorphous metal stator comprised of $Fe_{80}B_{11}Si_9$ amorphous metal ribbon could be essentially defined by a function having the form selected to define an upper bound to the magnetic losses of the amorphous metal stator. Table 5 recites the measured losses of the stator segment in Example 1 and the losses predicted by the above formula, each measured in watts per kilogram. The predicted losses as a function of f (Hz) and $B_{max}$ (Tesla) are calculated using the coefficients $c_1=0.0074$ and $c_2=0.000282$ and the exponents n=1.3, m=2.4, and q=1.5. The measured loss of the amorphous metal stator segment of Example 1 is less than the corresponding loss predicted by the formula.

TABLE 5

| Point | $B_{max}$ (Tesla) | Frequency (Hz) | Measured Core Loss (W/kg) | Predicted Core Loss (W/kg) |
|---|---|---|---|---|
| 1 | 0.3 | 60 | 0.1 | 0.10 |
| 2 | 0.7 | 60 | 0.33 | 0.33 |
| 3 | 1.1 | 60 | 0.59 | 0.67 |
| 4 | 1.3 | 60 | 0.75 | 0.87 |
| 5 | 1.4 | 60 | 0.85 | 0.98 |
| 6 | 0.3 | 1000 | 1.92 | 2.04 |
| 7 | 0.5 | 1000 | 4.27 | 4.69 |
| 8 | 0.7 | 1000 | 6.94 | 8.44 |
| 9 | 0.9 | 1000 | 9.92 | 13.38 |
| 10 | 1 | 1000 | 11.51 | 16.32 |
| 11 | 1.1 | 1000 | 13.46 | 19.59 |
| 12 | 1.2 | 1000 | 15.77 | 23.19 |
| 13 | 1.3 | 1000 | 17.53 | 27.15 |
| 14 | 1.4 | 1000 | 19.67 | 31.46 |
| 15 | 0.04 | 5000 | 0.25 | 0.61 |
| 16 | 0.06 | 5000 | 0.52 | 1.07 |
| 17 | 0.08 | 5000 | 0.88 | 1.62 |
| 18 | 0.1 | 5000 | 1.35 | 2.25 |
| 19 | 0.2 | 5000 | 5 | 6.66 |
| 20 | 0.3 | 5000 | 10 | 13.28 |
| 21 | 0.04 | 20000 | 1.8 | 2.61 |
| 22 | 0.06 | 20000 | 3.7 | 4.75 |
| 23 | 0.08 | 20000 | 6.1 | 7.41 |
| 24 | 0.1 | 20000 | 9.2 | 10.59 |
| 25 | 0.2 | 20000 | 35 | 35.02 |
| 26 | 0.3 | 20000 | 70 | 75.29 |

EXAMPLE 3

Preparation and Electro-Magnetic Testing of a Nanocrystalline Alloy Stator $Fe_{73.5}Cu_1Nb_3B_9Si_{1,2,3}$ amorphous metal ribbon, approximately 25 mm wide and 0.018 mm thick, is wrapped around a rectangular mandrel or bobbin having dimensions of approximately 25 mm by 90 mm. Approximately 1000 wraps of amorphous metal ribbon are wound around the mandrel or bobbin producing a rectangular core form having inner dimensions of approximately 25 mm by 90 mm and a build thickness of approximately 20 mm. The core/bobbin assembly is annealed in a nitrogen atmosphere. The anneal is carried out by performing the following steps: 1) healing the assembly up to 580° C.; 2) holding the temperature at approximately 580° C. for approximately 1 hour; and, 3) cooling the assembly to ambient temperature. The assembly is vacuum impregnated with an epoxy resin solution and cured at 120° C. for approximately 4.5 hours. When fully cured, the corn is removed from the core/bobbin assembly. The resulting stacked, epoxy bonded, nanocrystalline alloy core weighs approximately 1000 g.

A C-shaped section of a nanocrystalline alloy stator is obtained by removing a rectangular prism 60 mm long by 25 mm wide by 20 mm thick (approximately 1000 layers) from one of the long sides of the rectangular, wound, epoxy bonded, nanocrystalline alloy core. The prism is removed by cutting it from the epoxy bonded nanocrystalline alloy core with a 1.5 mm thick cutting blade. The cut surfaces of the rectangular prism and the remaining section of the core are etched in a nitric acid/water solution and cleaned in an ammonium hydroxide/water solution.

The C-shaped section of a nanocrystalline alloy stator has a core loss of less than 11.5 W/kg when excited at 1000 Hz to a peak induction level of 1.0 T.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. An amorphous metal stator for a radial flux motor having a rotor, said stator comprising a plurality of segments, each segment comprising a plurality of layers of amorphous metal strips, wherein each of said strips has a top and a bottom surface and is oriented such that (i) a line normal to either of said surfaces at substantially any point thereon is substantially perpendicular to the axis of rotation of said rotor, and (ii) when traversing said segment, said flux crosses one air gap.

2. An amorphous metal stator as recited by claim 1, each of said segments further comprising:
    a) a back-iron section having a first free end and comprising a plurality of contactingly stacked layers of amorphous metal strips; and
    b) a tooth section having a first free end and comprising a plurality of contactingly starched layers of amorphous metal strips;
    said back-iron section and said tooth section being arranged such that said first free end of said back-iron section contactingly engages said first free end of said tooth section and wherein an air gap is defined between said respective first free ends.

3. An amorphous metal stator as recited by claim 2, further comprising:
    c) an inner restraining means for securing said tooth section against being drawn out of engagement with said back-iron section; and
    d) an outer restraining means for securing said plurality of segments in generally circular abutting relation to each other.

4. An amorphous metal stator as recited by claim 3, wherein said inner restraining means comprises a bonding material that is applied to a substantial portion of said stator to provide each of said segments with increased mechanical strength, and said outer restraining means comprises a steel band provided peripherally about said stator.

5. An amorphous metal stator as recited by claim 3, wherein said inner restraining means comprises a bonding material that is applied to a substantial portion of said stator, excluding said respective first free ends of said back-iron and tooth sections.

6. An amorphous metal stator as recited by claim 4, wherein said bonding material is an epoxy resin.

7. An amorphous metal stator as recited by claim 3, wherein said inner restraining means partly comprises a bonding material and partly comprises a metal band.

8. An amorphous metal stator as recited by claim 2, said back-iron section being generally arcuate and said tooth section being generally straight.

9. An amorphous metal stator as recited by claim 1, each of said amorphous metal strips having a composition defined essentially by the formula: $M_{70-85}Y_{5-20}Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta, Hf, Ag, Au, Pd, Pt, and W; (ii) up to 10 atom percent of components (Y+Z) can be replaced by at least one of the non-metallic species In, Sn, Sb and Pb; and (iii) up to about one (1) atom percent of the components (M+Y+Z) can be incidental impurities.

10. An amorphous metal stator as recited by claim 9, wherein each of said amorphous metal strips has a composition containing at least 70 atom percent Fe, at least 5 atom percent B, and at least 5 atom percent Si, with the proviso that the total content of B and Si is at least 15 atom percent.

11. An amorphous metal stator as recited by claim 10 wherein each of said amorphous metal strips has a composition defined essentially by the formula $Fe_{80}B_{11}Si_4$.

12. An amorous metal stator as recited by claim 9, said amorphous metal strips having been heat-treated to form a nanocrystalline microstructure therein.

13. An amorphous metal stator as recited by claim 12, wherein each of said amorphous metal strips has a composition defined essentially by the formula $Fe_{100-u-x-y-z-w}R_uT_{x}$-$Q_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8.

14. An amorphous metal stator as recited by claim 12, wherein each of said amorphous metal strips has a composition defined essentially by the formula $Fe_{100-u-x-y-z-w}R_uT_{x}$-$Q_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18.

15. An amorphous metal stator as recited by claim 1, said stator having a core loss less than "L" when operated at an excitation frequency "f" to a peak induction level $B_{max}$ wherein L is given by the formula $L=0.0074\ f\ (B_{max})^{1.3}+0.00282\ f^{1.5}\ (B_{max})^{2.4}$, said core loss, said excitation frequency and said peak induction level being measured in watts per kilogram, hertz, and teslas, respectively.

16. An amorphous metal stator as recited by claim 15, said stator having a core-loss less than or approximately equal to 1 watts-per-kilogram of amorphous metal material when operated at a frequency of approximately 60 Hz and a flux density of approximately 1.4T.

17. An amorphous metal stator as recited by claim 15, said stator having a core-loss of less than or approximately equal to 12 watts-per-kilogram of amorphous metal material when operated at a frequency of approximately 1000 Hz and a flux density of approximately 1.0T.

18. An amorphous metal stator as recited by claim 15, said stator having a core-loss of less than or approximately equal to 70 watts-per-kilogram of amorphous metal material when operated at a frequency of approximately 20,000 Hz and a flux density of approximately 0.30T.

19. As amorphous metal stator as recited in claim 1, each of said segments having been subjected to a heat treatment comprising a heating and a cooling portion.

20. An amorphous metal stator as recited in claim 19, a magnetic field having been applied to each of said segments during at least the cooling portion of the heat treatment thereof.

21. An amorphous metal stator as recited in claim 19, said heat treatment having been carried out is a batch or continuous annealing oven.

22. An amorphous metal stator for a radial flux motor having a rotor, said stator comprising a plurality of segments, each segment having a plurality of layers of amorphous metal strips, wherein each of said strips has a top and a bottom surface and is oriented such that (i) a line normal to either of said surfaces at substantially any point thereon is substantially perpendicular to the axis of rotation of said rotor, and (ii) said flux traverses said segment without crossing an air gap, said stator further comprising:
 a) an inner restraining means for protecting and strengthening at least said tooth section; and
 b) an outer restraining means for securing said plurality of segments in generally circular abutting relation to each other.

23. An amorphous metal stator as recited by claim 22, wherein said inner restraining means comprises a bonding material that is applied to a substantial portion of said stator and that provides each of said segments with increased mechanical strength and wherein said outer restraining means comprises a steel band provided peripherally about said stator.

24. An amorphous metal stator as recited by claim 23, wherein said bonding material is an epoxy resin.

25. An amorphous metal stator as recited by claim 22, wherein said inner restraining means partly comprises a bonding material and partly comprises a metal band.

26. An amorphous metal stator for a radial flux motor having a rotor, said stator comprising a plurality of segments, each segment having a plurality of layers of amorphous metal strips, wherein each of said slips has a top and a bottom surface and is oriented such that (i) a line normal to either of said surfaces at substantially any point thereon is substantially perpendicular to the axis of rotation of said rotor, and (ii) said flux traverses said segment without crossing an air gap, said stator having a core loss less than "L" when operated at an excitation frequency "f" to a peak induction level $B_{max}$ wherein L is given by the formula $L=0.0074\ f\ (B_{max})^{1.3}+0.000282\ f^{1.5}\ (B_{max})^{2.4}$, said core loss, said excitation frequency and said peak induction level being measured in watts per kilogram, hertz, and teslas, respectively.

27. An amorphous metal stator as recited in claim 26, said stator further comprising:
 a) an inner restraining means for protecting and strengthening at least said tooth section; and
 b) an outer restraining means for securing said plurality of segments in generally circular abutting relation to each other.

28. An amorphous metal stator as recited in claim 26, each of said segments having been subjected to a heat treatment comprising a heating and a cooling portion.

29. An amorphous metal stator as recited in claim 28, a magnetic field being applied to each of said segments during at least the cooling portion of the heat treatment thereof.

30. As amorphous metal stator as recited in claim 28, said heat treatment being carried out in a batch or continuous annealing oven.

31. An amorphous metal stator as recited by claim 26, said stator having a core-loss less than or approximately equal to 1 watts-per-kilogram of amorphous metal material when operated at a frequency of approximately 60 Hz and a flux density of approximately 1.4T.

32. An amorphous metal stator as recited by claim 26, said stator having a core-loss of less than or approximately equal to 12 watts-per-kilogram of amorphous metal material when operated at a frequency of approximately 1000 Hz and a flux density of approximately 1.0T.

33. An amorphous metal stator as recited by claim 26, said stator having a core-loss of less than or approximately equal to 70 watts-per-kilogram of amorphous metal material when operated at a frequency of approximately 20,000 Hz and a flux density of approximately 0.30T.

34. An amorphous metal stator as recited by claim 26, each of said strips has a composition defined essentially by the formula: $M_{70-85}Y_{5-20}Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta, Hf, Ag, Au, Pd, Pt, and W; (ii) up to 10 atom percent of components (Y+Z) can be replaced by at least one of the non-metallic species In, Sn, Sb and Pb; and (iii) up to about one (1) atom percent of the components (M+Y+Z) can be incidental impurities.

35. A brushless radial flux DC motor comprising:

a) an amorphous metal stator and a rotor disposed for rotation therewithin, said stator comprising a plurality of segments, each segment comprising a plurality of layers of amorphous metal strips, wherein each of said strips has a top and a bottom surface and is oriented such that (i) a line normal to either of said surfaces at substantially any point thereon is substantially perpendicular to the axis of rotation of said rotor, and (ii) when traversing said segment, said flux crosses one air gap; and b) means for supporting said stator and said rotor in predetermined positions relative to each other.

36. A brushless radial flux DC motor comprising:

a) an amorphous metal stator and a rotor disposed for rotation therewithin, said stator comprising s plurality of heat-treated segments, each segment comprising a plurality of layers of amorphous meal strips, wherein each of said strips has a top and a bottom surface and is oriented such that (i) a line normal to either of said surfaces at substantially any point thereon is substantially perpendicular to the axis of rotation of said rotor, and (ii) said flux traverses said segment without crossing an air gap, and said stator having a core loss less than "L" when operated at an excitation frequency "f" to a peak induction level $B_{max}$ wherein L is given by the formula $L=0.0074\ f\ (B_{max})^{1.3}+0.000282\ f^{1.5}(B_{max})^{2.4}$, said core loss, said excitation frequency and said peak induction level being measured in watts per kilogram, hertz, and teslas, respectively; and b) means for supporting said stator and said rotor in predetermined positions relative to each other.

* * * * *

UNITED STATES PATENT AND TRADEMARK OFFICE
CERTIFICATE OF CORRECTION

PATENT NO. : 6,960,860 B1
APPLICATION NO. : 09/506533
DATED : November 1, 2005
INVENTOR(S) : Nicholas J. Decristofaro et al.

It is certified that error appears in the above-identified patent and that said Letters Patent is hereby corrected as shown below:

Column 18, Line 42, change "starched" to --stacked--.
Column 19, Line 29, change "$Fe_{80}B_{11}Si_4$" to --$Fe_{80}B_{11}Si_9$--.
Column 19, Line 30, change "amorous" to --amorphous--.
Column 19, Line 53, change "0.00282" to --0.000282--.
Column 19, Line 58, change "watts" to --watt--.
Column 19, Line 61, change "by" to --in--.
Column 19, Line 66, change "by" to --in--.
Column 20, Line 4, change "As" to --An--.
Column 20, Line 12, change "is" to --in--.
Column 20, Line 43, "slips" to --strips--.
Column 20, Line 50, change "$B_{max}$wherein" to --$B_{max}$ wherein--.
Column 21, Line 1, change "As" to --An--.
Column 21, Line 6, change "watts" to --watt--.
Column 21, Line 9, change "by" to --in--.
Column 21, Line 14, change "by" to --in--.
Column 21, Line 19, change "by" to --in--.
Column 21, Line 19, after "claim 26," insert --wherein--.
Column 22, Line 14, change "s" to --a--.
Column 22, Line 16, change "meal" to --metal--.

Signed and Sealed this

Sixteenth Day of January, 2007

JON W. DUDAS
*Director of the United States Patent and Trademark Office*

Page 1 of 1